United States Patent
Park et al.

(10) Patent No.: US 9,616,902 B2
(45) Date of Patent: Apr. 11, 2017

(54) SAFETY METHOD FOR PASSENGER OF VEHICLE

(71) Applicant: Hyundai Motor Company, Seoul (KR)

(72) Inventors: Han Gil Park, Suwon-Si (KR); Chang Hyun Lee, Seoul (KR); Yang Rae Cho, Suwon-Si (KR); Ean Soo Cho, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/951,380

(22) Filed: Nov. 24, 2015

(65) Prior Publication Data

US 2016/0159369 A1   Jun. 9, 2016

(30) Foreign Application Priority Data

Dec. 9, 2014   (KR) .................. 10-2014-0175531

(51) Int. Cl.
   *B60W 50/12*   (2012.01)
   *B60Q 9/00*   (2006.01)

(52) U.S. Cl.
   CPC ............ *B60W 50/12* (2013.01); *B60Q 9/00* (2013.01); *B60W 2400/00* (2013.01)

(58) Field of Classification Search
   None
   See application file for complete search history.

(56) References Cited

U.S. PATENT DOCUMENTS

| 2013/0151095 A1* | 6/2013 | Fyie | F16H 59/08 |
|---|---|---|---|
| | | | 701/62 |
| 2014/0229092 A1* | 8/2014 | Hermann | B60K 23/00 |
| | | | 701/116 |

FOREIGN PATENT DOCUMENTS

| KR | 1999-0020287 U | 6/1999 |
|---|---|---|
| KR | 10-2002-0053108 A | 7/2002 |
| KR | 10-2003-0024482 A | 3/2003 |
| KR | 10-2013-0000063 A | 1/2013 |
| KR | 10-2014-0079098 A | 6/2014 |

* cited by examiner

*Primary Examiner* — Edwin A Young
(74) *Attorney, Agent, or Firm* — Morgan, Lewis & Bockius LLP

(57) ABSTRACT

A safety method for a passenger of a vehicle may include a control logic for detecting a current gear position in a state where the vehicle is stopped, determining whether a passenger door and a rear seat door are open, and allowing driving in a state where the passenger door and the rear seat door are closed but limiting a vehicle drive by changing the gear position to a non-drivable gear position in a state where the passenger door or the rear seat door is open.

10 Claims, 2 Drawing Sheets

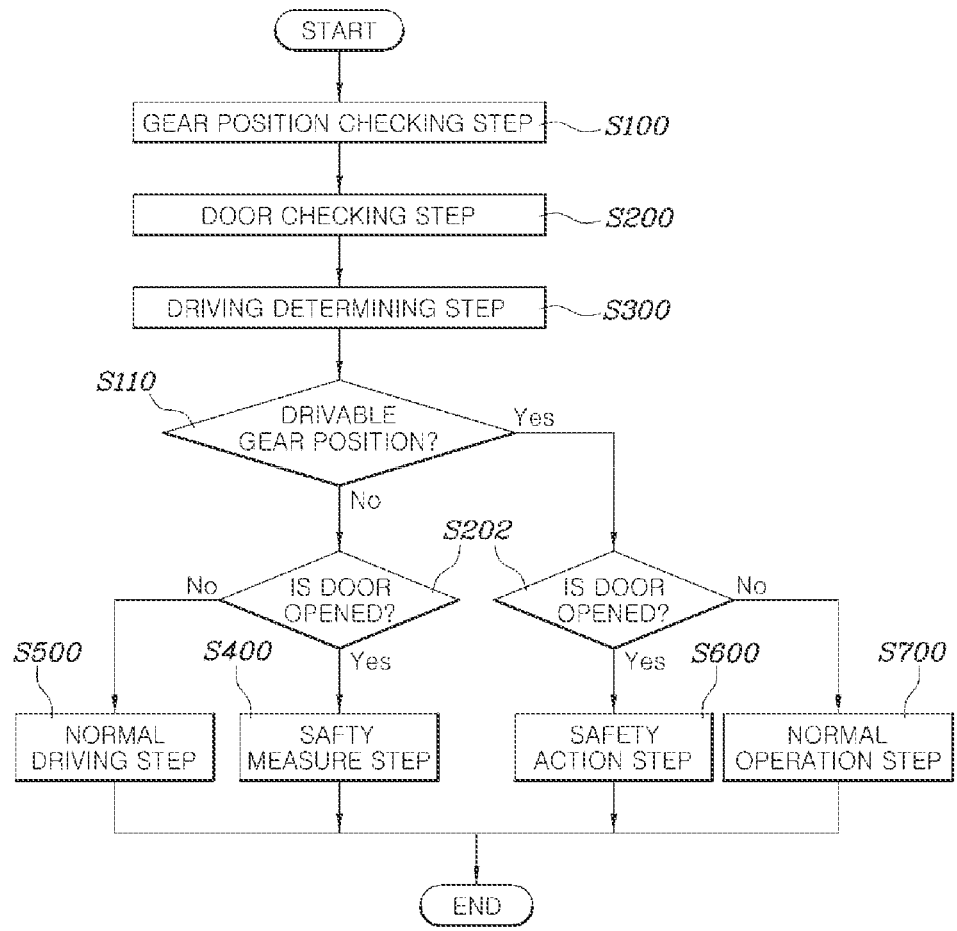

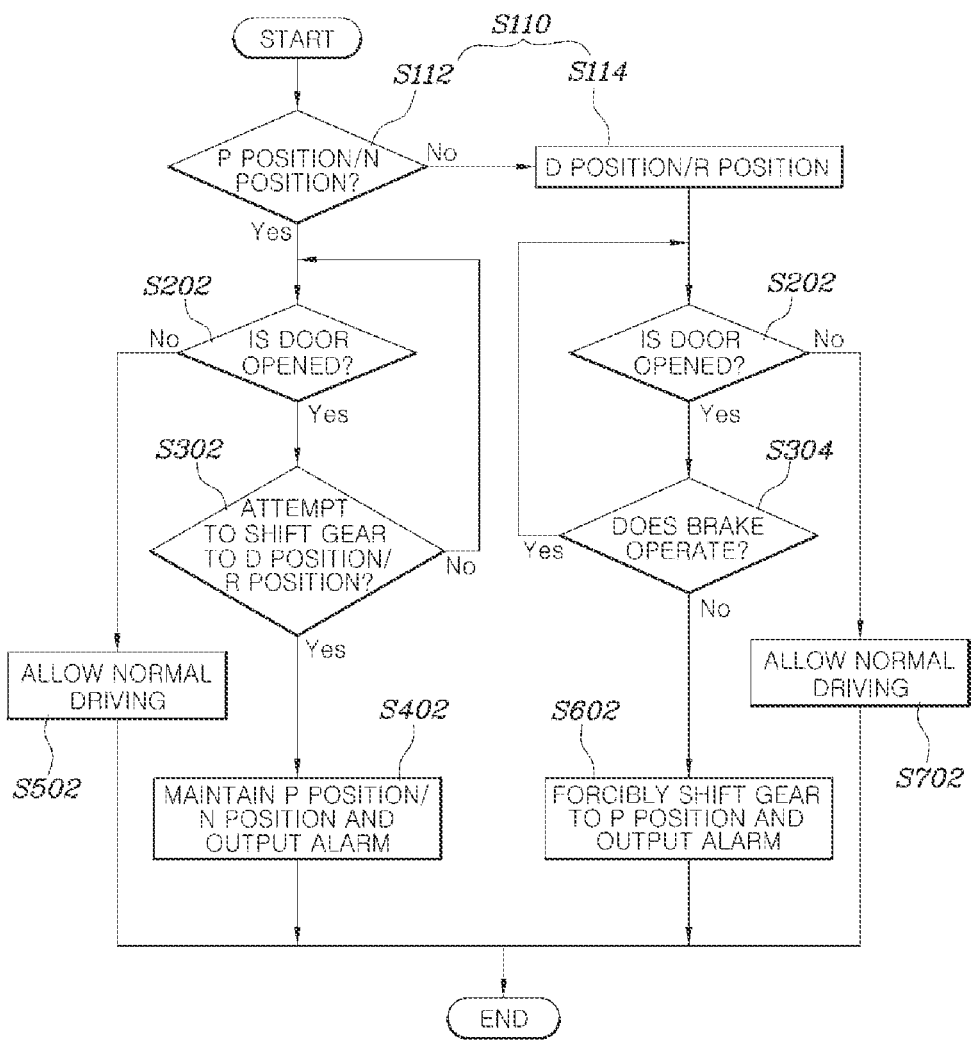

SAFETY METHOD FOR PASSENGER OF VEHICLE

CROSS REFERENCE TO RELATED APPLICATION

The present application claims priority to Korean Patent Application No. 10-2014-0175531, filed Dec. 9, 2014, the entire contents of which is incorporated herein for all purposes by this reference.

BACKGROUND OF THE INVENTION

Field of the Invention

The present invention relates generally to a safety method for a passenger of a vehicle, which prevents a safety accident involving a passenger by limiting vehicle drive when a passenger seat door or a rear sear door is open.

Description of Related Art

As well known to those skilled in the art, when a driver puts a shift lever in a drivable gear position (e.g. D, 2, L, and R), a vehicle with an automatic transmission is enabled to move forward and backward in a selected shift range by sensing a position of an inhibitor switch engaged with the shift lever to control a hydraulic circuit of the automatic transmission.

Nowadays, in order to prevent safety accidents, technology for allowing a door not to be opened is applied when driving in the drivable gear position.

Furthermore, since a vehicle, to which a shift by wire system is applied, is not mechanically connected to the transmission with a rod and a cable, it has a feature of controlling a gear shift condition according to the situation. By using this, when a driver opens a door according to conditions of a driver seat door and a seat belt, the gear is automatically shifted to the P position to secure safety.

However, when a safety protection precaution is not presented for a case where the vehicle is driven after being started with the vehicle door open, an accident may occur while the vehicle is driven with a passenger in the vehicle or with a door open.

In order to address such an issue, when the vehicle door is opened, it is indicated by lighting a lamp. In this case, since driving is performed in a state where the door is open due to carelessness of the driver, safety of the passenger may not be secured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a safety method for a passenger of a vehicle, which prevents a safety accident involving a passenger by limiting vehicle drive when a passenger seat door or a rear sear door is open.

In order to accomplish the above object, the present invention provides a safety method for a passenger of a vehicle. The method includes: a control logic for detecting a current gear position in a state where the vehicle is stopped, determining whether a passenger door and a rear seat door are open, and allowing driving in a state where the passenger door and the rear seat door are closed but limiting a vehicle drive by changing the gear position to a non-drivable gear position in a state where the passenger door or the rear seat door is open.

The control logic may include a gear position checking step for detecting a current gear position in a state where the vehicle is stopped; a door checking step for determining whether the passenger seat door and the rear seat door are open; a driving determining step for determining whether the vehicle is going to enter a driving mode; and a safety precaution step for fixing the gear position to the non-drivable gear position when the vehicle enters the driving mode in a state where the current gear position is detected as in the non-drivable gear position and the passenger seat or the rear seat door is determined as being open.

When the current gear position is detected as being in the non-drivable gear position, it may be determined that the vehicle is going to enter the driving mode when a gear is shifted from the non-drivable gear position to a drivable gear position at the gear position checking step.

The driving determining step may further include a normal driving step for enabling the vehicle to be normally driven, when the current gear position is detected as being in the non-drivable gear position through the gear position checking step and the passenger seat door and the rear seat door are determined as being closed through the door checking step.

At the safety precaution step, the gear position may be fixed to the non-drivable gear position and at the same time, a warning message is sent to a driver.

The driving determining step may further include a safety action step for changing the gear position to a non-drivable gear position, when the current gear position is detected as being in a non-drivable gear position through the gear position checking step and the passenger seat door and the rear seat door are determined as being open through the door checking step in a state where the vehicle is stopped.

The vehicle may be maintained to be stopped by operating a brake in a state where the current gear position is detected as being in a drivable gear position through the gear position checking step.

When the current gear position is detected as being in a drivable gear position in the gear position checking step and the brake operates, it may be determined at the driving determining step that the vehicle is going to enter the driving mode when the brake operation is released.

The driving determining step may further include a normal operation step for enabling the vehicle to be normally driven at a time of releasing the brake operation, when the current gear position is detected as being in a non-drivable gear position through the gear position checking step, the brake operates, and the passenger seat door and the rear seat door are determined as being closed through the door checking step.

At the safety action step, the gear position may be fixed to the non-drivable gear position and at the same time, a warning message is sent to a driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a flowchart of a safety method for a passenger of a vehicle according to an embodiment of the present invention; and FIG. 2 is a flowchart for explaining the safety method for a passenger of a vehicle illustrated in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

Reference now should be made to the drawings, in which the same reference numerals are used throughout the different drawings to designate the same or similar components.

FIG. 1 is a flowchart of a safety method for a passenger of a vehicle according to an exemplary embodiment of the present invention and FIG. 2 is a flowchart for explaining the safety method for a passenger of a vehicle illustrated in FIG. 1.

The present invention is applied to a vehicle to which a shift by wire system has been applied, and a gear position of the vehicle may be changed and set by a control accordingly. The gear position is set to be a specific gear position according to whether a door is open by interlinking such a shift by wire system with whether the door is open.

The safety method for a passenger of a vehicle according to an exemplary embodiment of the present invention includes a control logic for detecting a current gear position in a state where the vehicle is stopped, determining whether a passenger seat door and a rear seat door are open, and allowing driving in a state where the passenger seat door and the rear seat door are closed but limiting a vehicle drive by changing the gear position to a non-drivable gear position in the state where the passenger seat door or the rear seat door is open.

In other words, the present invention pertains to determining the current gear position and determining whether the passenger seat door and rear seat door are open, and limiting the vehicle drive by changing the gear position to the non-drivable gear position when the vehicle enters a driving mode in the state where the passenger seat door or the rear seat door is open. Therefore the present invention may prevent a safety accident involving a passenger by preventing the vehicle from being driven when any one of the passenger seat door and rear seat door is open. In order to determine a stop state of the vehicle, a traveling speed of the vehicle may be further determined in addition to the gear position.

In detail, the control logic of the method of safety for a passenger of a vehicle according to an exemplary embodiment of the present invention may include a gear position checking step (S100) for detecting a current gear position, a door checking step (S200) for determining whether a passenger seat door and a rear seat door is open, a driving determining step (S300) for determining whether the vehicle enters a driving mode, and a safety precaution step (S400) for fixing the gear position to a non-drivable gear position when the vehicle enters the driving mode in a case where the current gear position is detected as being in the non-drivable gear position and the passenger seat door or the rear seat door is open.

At the gear position checking step (S100), the current gear position is detected (step S110) to check (step S114) whether the current gear position is in N position or P position (step S112), which is a non-drivable gear shift position, or is in D position or R position, which is a drivable gear position.

At the door checking step (S200), it is determined (S202) whether a passenger seat door or a rear seat door is open or closed. Here, the determination is performed on all doors including not only the passenger seat door and rear seat doors but also the driver's seat door, and additionally it may be further determined whether the trunk door is open. In particular, in an exemplary embodiment of the present invention, it is determined whether the passenger seat door and the rear seat door are open in order to consider safety of a passenger.

At the driving determining step (S300), it is determined whether the vehicle is going to enter into a driving mode and the determination is made at a moment when the gear position is shifted from the non-drivable gear position to the drivable gear position or when the brake operation is released.

Through the gear position checking step (S100), door checking step (S200), and driving determining step (S300), the current gear position is detected as being in a non-drivable gear position, the passenger seat door or the rear seat door is determined as being open, and in this state, when the vehicle enters the driving mode, the vehicle drive is limited by performing the safety precaution step (S400) for fixing the gear position to the non-drivable gear position. In other words, when it is confirmed that the vehicle enters the driving mode in a state where at least one of the passenger seat door and the rear seat door is open, the vehicle drive is limited to prevent a safety accident by immediately changing the gear position to the N position or P position, which is non-drivable gear position.

In detail, when the current gear position is detected as being in a non-drivable gear position through the gear position checking step (S100), it may be determined (step S302) at the driving determining step (S300) that the vehicle is going to enter the driving mode when a gear is shifted from the non-drivable gear position to the drivable gear position.

In other words, when the current gear position is in the N position or the P position, which are non-drivable gear positions, at the gear position checking step (S100), the vehicle is currently limited in driving to be stopped. In this state, when the gear is shifted from the non-drivable gear position to the D position or R position, which are drivable gear positions, at the time of determining that the vehicle enters the driving mode at the driving determining step (S300), it is determined that the vehicle is going to be driven.

Like this, when the current gear position is detected as in the non-drivable gear position through the gear position checking step (S100), determination for entering a driving mode may be made at the driving determining step (S300) by detecting whether the gear is shifted from the non-drivable gear position to the drivable gear position. Accordingly, when the passenger seat door or the rear seat door is determined as being open, even though a driver tries to shift the gear position to the drivable gear position, the gear position is forcibly changed (step S402) to the N position or P position and fixed at the safety precaution step (S400), and the vehicle may be normally driven after the passenger seat door and rear seat door are completely closed.

Furthermore, when the current gear position is detected as being in a non-drivable gear position through the gear position checking step (S100), and the passenger seat door and rear seat door are determined as being closed through the door checking step (S200), the driving determining step (S300) may further include a normal driving step (S500) for enabling the vehicle to be normally driven when the vehicle enters the driving mode.

In other words, when it is determined that the current gear position is in the N position or P position, which are the non-drivable gear positions, and the vehicle is stopped, and the passenger seat door and the rear seat door are closed, it is a state where a passenger has be completely gotten into or out of the vehicle and thus safe driving is possible. In this case, the normal driving step (S500) is performed for enabling the vehicle to be normally driven by allowing (S502) a corresponding gear shift when the driver attempts to shift the gear position to the D position or the R position, which are drivable gear positions, in order to enter the driving mode. Like this, a safety accident, which may occur in a state where the passenger seat door and the rear seat door are open, may be prevented by enabling the vehicle to be driven under a stable condition in which the passenger sear door and the rear seat door are completely closed.

Furthermore, at the safety precaution step (S400), the gear position may be fixed to the non-drivable gear position and a warning message may be sent to the driver at the same time.

Like this, at the safety precaution step (S400), the state where vehicle doors are open may be indicated by sending a warning message to the driver, while the vehicle drive is limited by changing the gear position to a non-drivable gear position and fixing it, since the passenger seat door or the rear seat door is open.

Such a warning message may be continuously delivered to a cluster through not only a warning lamp but also a warning sound and may lead to closure of the opened door.

Furthermore, when the current gear position is detected as in a non-drivable gear position in a state where the vehicle is stopped through the gear position checking step (S100), and the passenger seat door or rear seat door is determined as being open through the door checking step (S200), the driving determining step (S300) may further include a safety action step (S600) for enabling the gear position to be fixed to the non-drivable gear position when the vehicle enters a drivable mode.

In other words, the current gear position is detected as being in a drivable gear position in a state where the vehicle is stopped, and the gear position is in the D position or R position, which are drivable gear positions. However, the state where the gear position is detected as being in a drivable gear position in the state where the vehicle is stopped indicates that the brake is being operated (step S304), which may be a situation where the driver has temporarily stopped the vehicle.

In this state, when the passenger seat door or the rear seat door is determined as being open and the vehicle is going to enter a drivable mode, the gear position is changed to the N position or P position, which are non-drivable gear positions, and fixed (step S602).

Furthermore, when the current gear position is detected as being in a drivable gear position through the gear position checking step (S100) and the brake operates, the vehicle may be determined as entering the driving mode at the time of releasing the brake operation at the driving determining step (S300).

In other words, when the current gear position is determined as being in a D position or P position, which are drivable gear positions, through the gear position checking step (S100), the vehicle is currently in the drivable state and maintains the stopped state according to the brake operation. In this state, in the driving determining step (S300), when the brake operation is released, the vehicle is determined to enter the driving mode.

Like this, when the current gear position is detected as being in a non-drivable gear position through the gear position checking step (S100), determination for driving may be made at the driving determining step (S300) by detecting whether the brake operation is released. Accordingly, when the passenger seat door or the rear seat door is determined as being open, at the safety action step (S600), when the driver releases pressure applied to a brake pedal to release the brake operation, the gear position is forcibly changed to the N position or P position and fixed, and the vehicle may be normally driven after the passenger seat door and rear seat door are completely closed.

Furthermore, when the current gear position is detected as in the non-drivable gear position through the gear position checking step (S100), the brake operates, and the passenger seat door and rear seat door are determined as being closed through the door checking step (S200). The driving determining step (S300) may further include a normal operation step (S700) for enabling the vehicle to be normally driven when the brake operation is released.

In other words, when the current gear position is in the D position or R position, which are drivable gear positions, and the passenger seat door and the rear seat door are determined as being closed, the vehicle is in a state where safety is secured during drive and the vehicle is enabled to be normally driven when the brake operation is released (operation S702). Like this, the safety accident, which may occur in a state where the vehicle is driven while the passenger seat door and the rear seat door are open, may be prevented by enabling the vehicle to be driven under a stable condition in which the passenger sear door and the rear seat door are completely closed.

Furthermore, at the safety action step (S600), the gear position may be fixed to the non-drivable gear position and a warning message may be sent to the driver at the same time.

At the safety action step (S600), the state where vehicle doors are open may be notified by sending a warning message to the driver, while the vehicle drive is limited by changing the gear position to a non-drivable gear position and fixing it, since the passenger seat door or the rear seat door is open.

Such a warning message may be continuously delivered to a cluster through not only a warning lamp but also a warning sound and may lead to close the opened door.

According to a method of safety for a passenger of a vehicle having the above-described structure, the safety accident may be prevented by limiting vehicle drive when a passenger door or a rear sear door is open.

Like this, safety and reliability are secured to improve quality of a vehicle by considering the safety accident of the passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A safety method for a passenger of a vehicle, the method comprising:
a control logic for detecting a current gear position in a state where the vehicle is stopped, determining whether a passenger door and a rear seat door are open, and allowing driving in a state where the passenger door and the rear seat door are closed but limiting a vehicle drive by changing the gear position to a non-drivable gear position in a state where the passenger door or the rear seat door is open.

2. The safety method for the passenger of the vehicle of claim 1, wherein the control logic comprises:
a gear position checking step for detecting the current gear position in a state where the vehicle is stopped;
a door checking step for determining whether the passenger seat door and the rear seat door are open;
a driving determining step for determining whether the vehicle is going to enter a driving mode; and
a safety precaution step for fixing the gear position to the non-drivable gear position when the vehicle enters the driving mode in a state where the current gear position is detected as in the non-drivable gear position and the passenger seat or the rear seat door is determined as being open.

3. The safety method for the passenger of the vehicle of claim 2, wherein, when the current gear position is detected as being in the non-drivable gear position, it is determined that the vehicle is going to enter the driving mode when a gear is shifted from the non-drivable gear position to a drivable gear position at the gear position checking step.

4. The safety method for the passenger of the vehicle of claim 2, wherein the driving determining step further comprises a normal driving step for enabling the vehicle to be normally driven, when the current gear position is detected as being in the non-drivable gear position through the gear position checking step and the passenger seat door and the rear seat door are determined as being closed through the door checking step.

5. The safety method for the passenger of the vehicle of claim 2, wherein at the safety precaution step, the gear position is fixed to the non-drivable gear position and at a same time, a warning message is sent to a driver.

6. The safety method for the passenger of the vehicle of claim 2, wherein the driving determining step further comprises a safety action step for changing the gear position to a non-drivable gear position, when the current gear position is detected as being in a non-drivable gear position through the gear position checking step and the passenger seat door and the rear seat door are determined as being open through the door checking step in a state where the vehicle is stopped.

7. The method of safety for the passenger of the vehicle of claim 6, where the vehicle is maintained to be stopped by operating a brake in a state where the current gear position is detected as being in a drivable gear position through the gear position checking step.

8. The method of safety for the passenger of the vehicle of claim 7, wherein, when the current gear position is detected as being in the drivable gear position in the gear position checking step and the brake operates, it is determined at the driving determining step that the vehicle is going to enter the driving mode when a brake operation is released.

9. The method of safety for the passenger of the vehicle of claim 7, wherein the driving determining step further comprises a normal operation step for enabling the vehicle to be normally driven at a time of releasing the brake operation, when the current gear position is detected as being in a non-drivable gear position through the gear position checking step, the brake operates, and the passenger seat door and the rear seat door are determined as being closed through the door checking step.

10. The method of safety for the passenger of the vehicle of claim 6, wherein at the safety action step, the gear position is fixed to the non-drivable gear position and at a same time, a warning message is sent to a driver.

* * * * *